United States Patent Office 2,720,493
Patented Oct. 11, 1955

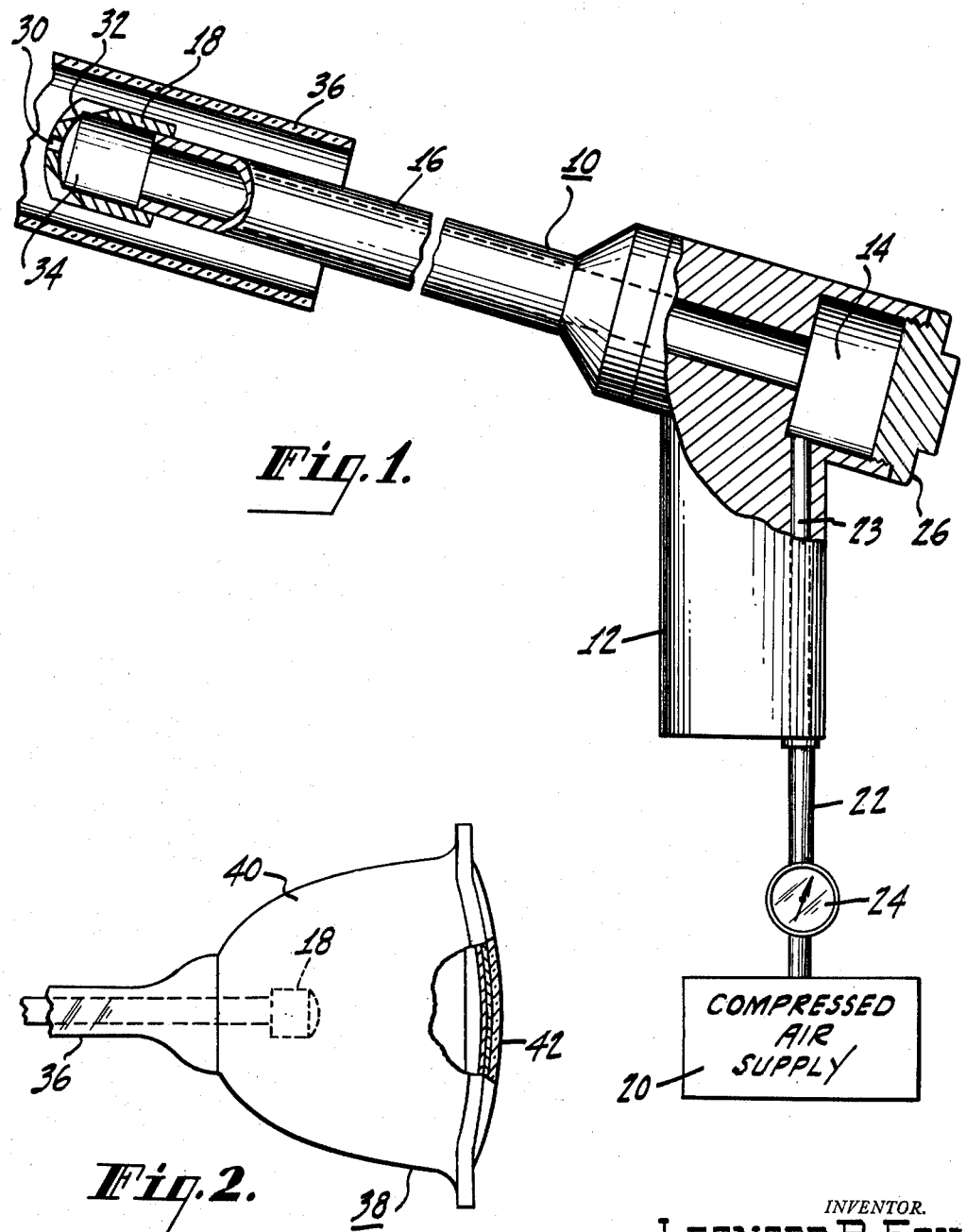

2,720,493

REMOVAL OF SCREENS FROM KINESCOPES

Leonard P. Fox, Lancaster, Pa., assignor to Radio Corporation of America, a corporation of Delaware Application March 27, 1953, Serial No. 344,929

10 Claims. (Cl. 252—301.6)

This invention relates to cathode ray tubes and particularly to apparatus for and a method of removing fluorescent and other materials from viewing screens of such tubes.

A cathode ray tube is one having an elongated envelope with an electrode structure or electron gun at one end for forming a cathode ray beam which is focussed and scanned over a fluorescent screen at the other end of the envelope to produce an image or picture thereon. Such a fluorescent screen may comprise blue fluorescing zinc sulfide and yellow fluorescing zinc cadmium sulfide in the desired proportions to provide a white luminescence, for example. In the manufacture of the tube the phosphors are mixed with other materials, such as a water soluble silicate binder, for example, which facilitate settling the phosphors on and their adherence to the glass faceplate of the cathode ray tube.

During the manufacture of cathode ray tubes a substantial number of tubes are rejected as failing to meet certain standards of performance. Since the tube components, especially the tube envelope, are costly, an effort is made to salvage parts which may be re-processed and used in other tubes. In the case of the tube envelope, re-processing usually involves removal of the fluorescent materials or phosphors from the viewing screen or faceplate of the tube.

In the past, fluorescent materials have been removed from cathode ray tubes by means of acid solutions. This method has proven satisfactory for use with glass cathode ray tubes (or kinescopes, as television picture tubes are usually called) and some composite metal-glass tubes. However, the present trend is to construct the metal envelopes of kinescopes of cold rolled steel, which is much cheaper than the high-chrome steels heretofore used for that purpose. The use of cold rolled steel in the cone of the tube requires that a glass having matching physical characteristics, that is, a high coefficient of thermal expansion, be used for the faceplate and the glass neck of the tube. Both the glass and cold rolled steel are by their nature characterized by poor resistance to chemical attack, so acid solutions as a means for removing phosphor materials cannot be used in this case.

Another disadvantage of using acid to remove fluorescent coating materials from screens is that undesired chemical reactions take place with the phosphors. Consequently, the phosphors thus removed are wasted, because the cost of salvaging the phosphor and reclaiming it is more than the cost of preparing new phosphors. A further serious disadvantage involved in the use of an acid or other liquid removing agent, resides in the fact that a wetted coating is characterized by an appreciably strong adherence which renders complete removal of the coating difficult. Additional disadvantages of acid removal of screens are that toxic by-products may be produced by chemical reaction between the acid and the phosphors, and the fact that the acid itself is rather costly.

A principal object of the present invention is to provide an improved method of removing fluorescent screens from cathode ray tubes, particularly those having cold rolled steel envelope parts.

Another object is to provide a novel method of removing the fluorescent screen coating from faceplates or cathode envelopes to be salvaged, while the coating is dry and relatively loosely adherent on the faceplates.

A further object of the present invention is to provide an advantageous method for removing phosphor coatings from cathode ray tubes in a readily salvageable form.

Another object of the present invention is to provide a method for removing fluorescent screens from kinescope faceplates, which is free from the dangers of toxicity which were inherent in prior art methods.

Yet another object of the present invention is to provide a novel and more economical method for removing materials constituting screens from cathode ray tubes.

The above and related objects are accomplished in accordance with the present invention by a method involving the step of directing a jet of gas such as air upon the screen which is to be removed. Dry air is preferred for facilitating the removal and because of its cheapness. The gas is applied through a nozzle which is adapted to be inserted into the interior of the tube envelope via a tube neck or other opening in the tube envelope. After the screen coating materials have been loosened and removed from the faceplate to other regions in the tube envelope, they are removed or emptied from the envelope. Thereafter the removed materials are placed in a water bath in which the water soluble materials dissolve to provide a solution. The insoluble coating materials are then separated from the solution, as by filtration, for example, and are in condition for re-use after very little further processing.

Referring to the accompanying drawings:

Figure 1 is an elevational view of an apparatus, including an air "gun," suitable for the practice of the method of the present invention, the barrel of the "gun" being presented to the interior of the cathode ray tube; and Figure 2 is an elevational view, partly in section, of a typical cathode ray tube envelope in which the gun apparatus of Figure 1 may be used to remove adherent materials on the interior thereof.

Referring to Figures 1 and 2, the gun 10 comprises a handle 12, a chamber 14, barrel 16, and a nozzle 18. A source of compressed dry air 20 is connected to the gun 10 via a tube 22, which is preferably flexible, and which contains a pressure indicating gauge 24. Channel 23 connects the tube 22 to the chamber 14. A threaded end cap 26 is provided at one end of the chamber 14. This end cap may be removed to permit cleaning of the barrel 10 or the channel 28 in the handle 12 of the gun 10. The nozzle 18 illustrated in Figure 1 has three apertures 30, 32, 34 through which the jets of gas escape. However, nozzles having differently arranged apertures or having only a single aperture could be substituted provided the jet was sprayed in a pattern which would remove the screen in the desired location.

In practice, the barrel of the gun 10 is inserted through the neck 36 of the cathode ray tube envelope 38 until the nozzle 18 extends into the metal shell 40 of the tube as illustrated in Figure 2. When the nozzle 18 is in this position it is approximately 6 inches from the faceplate 42. While this distance has been found satisfactory, the optimum distance may vary in view of the nozzle design or air pressure, for example. The phosphor screen 44, containing both the fluorescent phosphors, binder materials and perhaps other water soluble materials, adheres to the inner surface of phosphor 42. The jet flow may be controlled by a valve (not shown) in the air supply line. Normally the air pressure used in air removal of screens in accordance with the present invention is from 80 to 100 pounds gauge pressure. Approximately a minute, under average conditions, is required to remove a fluorescent screen from a typical composite metal-glass kinescope. The time requirement, in any case, may vary in accordance with the pressure of the compressed air supply, number, size, and location of the apertures in the nozzle 18 and the area and type of screen to be removed. The loosened and removed screen materials which have not been blown out the neck 36 of the tube envelope 38 may be removed by pouring them out through the open end of the neck 36. An air filter, not shown, may be provided to capture the particles blown from the tube while the jet is operating. While a hand operated gun 10 is described, the method of the present invention is readily adaptable to use in automatic multiple position tube making machines.

It is possible also to avoid the necessity of moving the gun barrel in order to remove the screen from all portions of the faceplate. To accomplish this, a rubber hose is used as the barrel 16, and the reaction of the escaping air or gas within the enclosed envelopes causes the flexible barrel 16 to move in a random manner. The random movement of the flexible barrel, over a period of a minute or more, directs the jet over the entire surface of the faceplate from which the screen is to be removed.

The use of a flexible barrel has the additional advantage that it lessens the danger of breaking the glass neck 36 when the barrel 16 is inserted within the envelope 38. This advantage becomes especially important if the present invention is applied to a multiple position tube making machine where precise indexing of the neck 36 to the barrel 16 would be difficult to achieve.

The use of an air jet to remove fluorescent screen materials has proven superior to using the water jet. Water jets are rather ineffective because the wet adherence strength of the screen is much greater than the dry adherence strength. In addition, it is desirable to subject the metal portion 40 of the envelope 38 to water as few times as possible because of the tendency of the metal to rust. Further, when air is used to remove the screen materials there is no problem of disposing of the removal agent as is the case when acids or other liquids are used.

However, it has been found that if the pressure of the air jet has less than 80 pounds per square inch gauge pressure the screen may not be entirely removed. On the other hand, jets having pressures greater than 100 pounds per square inch tend to build up high pressures inside the tube because the air cannot escape rapidly enough through the tube neck. Such pressures tend to and often do cause cracking of the faceplate or otherwise cause damage in the area of the glass-to-metal seal between the faceplate and the metal bulb.

Thus, it is apparent that the phosphors of screens removed in accordance with the present invention may be readily salvaged by simple water bath treatment. The removal method has no adverse effect on either the glass or metal of the tube envelope. Further, the use of air in the screen removal operation is more economical than prior art methods.

What is claimed is:

1. The method of salvaging viewing screen materials containing water insoluble phosphors and water soluble binding and other materials from the interior surface of the faceplate of a composite metal-glass cathode ray tube envelope, said method comprising the steps of directing a jet of air at 80 to 100 pounds per square inch gauge pressure upon said viewing screen to loosen and remove said materials, emptying said removed materials from said envelope, subjecting said emptied and removed materials to a water bath to dissolve said water soluble materials, and then separating the water insoluble phosphors from the water bath solution.

2. The method of salvaging viewing screen materials containing water insoluble phosphors and water soluble binding and other materials from the interior surface of the faceplate of a composite metal-glass cathode ray tube envelope, said method comprising the steps of directing a jet of air at 80 to 100 pounds per square inch gauge pressure over the surface of said viewing screen to loosen and remove said materials, emptying said removed materials from said envelope, subjecting said emptied and removed materials to a water bath to dissolve said water soluble materials, and then separating the water insoluble phosphors from the water bath solution by filtration.

3. The method of salvaging viewing screen materials containing water insoluble phosphors and water soluble binding and other materials from the interior surface of the faceplate of a composite metal-glass cathode ray tube envelope, said method comprising the steps of directing a jet of air at 80 to 100 pounds per square inch gauge pressure over the surface of said viewing screen to loosen and remove said materials, emptying said removed materials from said envelope, subjecting said emptied and removed materials to a water bath to dissolve said water soluble materials, and then separating the water insoluble phosphors from the water bath solution by centrifuging.

4. The method of removing viewing screen materials from a viewing screen on the interior surface of the faceplate of a composite metal-glass cathode ray tube envelope, said method comprising the steps of directing a jet of air at 80 to 100 pounds per square inch gauge pressure over the surface of said viewing screen to loosen and remove said materials, and then emptying said materials from said envelope.

5. Method of salvaging from the interior surface of a faceplate of a composite metal-glass cathode ray tube envelope, viewing screen coating materials containing water insoluble phosphors and water soluble binder and other materials having reduced adherence to said interior surface when dry, said method comprising the steps of directing a jet of dry air having a force of 80 to 100 pounds per square inch gauge pressure for loosening said materials from said interior surface and causing said materials to be removed therefrom to other portions within said envelope in loose relation therewith, removing said loose materials from said envelope, dissolving in a water bath said water soluble binding and said other materials from said materials removed from said envelope to provide a solution wherein said water soluble binder and said other materials are the solutes, and separating the water insoluble phosphors from said solution.

6. Method of salvaging from the interior surface of a faceplate of a composite metal-glass cathode ray tube envelope viewing screen coating materials containing water insoluble phosphors and water soluble binder and other materials having reduced adherence to said interior surface when dry, said method comprising the steps of directing a jet of dry air at 80 to 100 pounds per square inch gauge pressure for loosening said materials from said interior surface and causing said materials to be removed therefrom to other portions within said envelope in loose relation therewith, removing said loose materials from said envelope, dissolving in a water bath said water soluble binder and said other materials from said materials removed from said envelope to provide a solution wherein said water soluble binder and said other materials are the solutes, and separating the water insoluble phosphors from said solution.

7. The method of salvaging composite metal-glass kinescope bulbs which are adversely affected by acids and viewing screen materials containing water insoluble phosphors and water soluble binding and other materials from the interior surface of the faceplates of said bulbs, said method comprising the steps of directing a jet of air at 80 to 100 pounds per square inch gauge pressure over the surface of said viewing screen to loosen and remove said materials from said faceplate, emptying said removed materials from said envelope, subjecting the emptied and removed materials to a water bath to dissolve said water soluble materials, and then separating the water insoluble phosphors from the water bath solution.

8. The method of salvaging composite metal-glass kinescope bulbs which are adversely affected by acids and viewing screen materials containing water insoluble phosphors and water soluble binding and other materials from the interior surface of the faceplate of said bulbs, said method comprising the steps of directing a jet of air at 80 to 100 pounds per square inch gauge pressure over the surface of said viewing screen to loosen and remove said materials from said faceplate, emptying said removed materials from said envelope, subjecting the emptied and removed materials to a water bath to dissolve said water soluble materials, and then separating the water insoluble phosphors from the water bath solution.

9. The method of salvaging composite metal-glass kinescope bulbs which are adversely affected by acids and which have defective viewing screens comprising an adhering coating on the faceplate of said bulbs, said method comprising directing a jet of air at 80 to 100 pounds per square inch gauge pressure over the surface of said viewing screen to loosen and remove said coating from said faceplate and then emptying said removed coating from said envelope.

10. The method of salvaging composite metal-glass kinescope bulbs which are adversely affected by acids and which have defective viewing screens comprising an adhering coating on the faceplate of said bulbs, said method comprising directing a jet of air at 80 to 100 pounds per square inch gauge pressure over the surface of said viewing screen to loosen and remove said coating from said faceplate and then emptying said removed coating from said envelope.

<center>No references cited.</center>